United States Patent [19]
Drew

[11] 3,991,515
[45] Nov. 16, 1976

[54] PROCESS FOR PRODUCING NAVAL STORES

[75] Inventor: John Drew, Jacksonville, Fla.

[73] Assignee: SCM Corporation, New York, N.Y.

[22] Filed: Mar. 22, 1976

[21] Appl. No.: 668,905

[52] U.S. Cl. ............................ 47/10; 71/121; 47/57.5
[51] Int. Cl.² .................................... A01G 23/10
[58] Field of Search ............. 71/121; 47/57.5, 10

[56] References Cited
UNITED STATES PATENTS

| | | | |
|---|---|---|---|
| 1,740,484 | 12/1929 | Von Behr | 47/57.5 |
| 2,947,111 | 8/1960 | Zobrist | 47/57.5 X |
| 3,022,604 | 2/1962 | Greth et al. | 47/10 |
| 3,235,357 | 2/1966 | Loux | 71/121 X |
| 3,280,504 | 10/1966 | Laing | 47/57.5 |
| 3,359,681 | 12/1967 | Clements | 47/10 |
| 3,839,823 | 10/1974 | Roberts et al. | 47/10 |
| 3,858,354 | 1/1975 | Soulard | 47/10 |
| 3,861,901 | 1/1975 | MacMurray | 71/121 X |
| 3,880,643 | 4/1975 | Cooke et al. | 71/121 X |
| 3,910,783 | 10/1975 | Hunter et al. | 71/121 X |

*Primary Examiner*—Robert E. Bagwill
*Attorney, Agent, or Firm*—Merton H. Douthitt

[57] ABSTRACT

In a process for chemically stimulating the production of oleoresinous material in association with living wood cells it is advantageous to use a dilute dispersion of primary amine.

6 Claims, No Drawings

3,991,515

PROCESS FOR PRODUCING NAVAL STORES

BACKGROUND OF THE INVENTION

This invention relates to an improvement in process for chemically inducing the production of oleoresinous material in association with living wood cells, typically in a living pine tree from the U.S. southeast such as slash pine or loblolly pine, and to oleoresin-enriched wood harvested from such tree.

Oleoresinous material can be recovered from such oleoresin-enriched wood by conventional pulping or extraction methods. "Naval stores" such as turpentine and rosin are significant components of the recoverable oleoresinous material.

The prior art most relevant to this improvement is believed to be U.S. Pat. No. 3,839,823 assigned to the United States of America as represented by the Secretary of Agriculture; the Komissarov et al article appearing in the U.S.S.R. journal "Gidroldz. Lesekhin. Prom." 1968, 21 (5), 21, and abstracted in Chem. Abs. 1968, Vol. 69, 88119; The Study Plan and Final Office Report of T. A. Harrington to the Naval Stores and Timber Production Laboratory of the U.S. Forest Service, Olustee, Florida, FS-SE-1501, Study NS 146, September 1967, entitled "A Preliminary Evaluation of New Chemicals as Gum Flow Stimulators"; The Study Plan of D. A. Roberts to the Naval Stores and Timber Production Laboratory of the U.S. Forest Service, Olustee, Florida, FS-SE-1501, Study NS 165, May 1969, entitled "Extent of Cell Kill in Slash and Longleaf Pines Following Treatment with 2,4D-, Sulfuric Acid, and Paraquat"; Research Note SE 191 dated April 1973 from the U.S. Forest Service at Olustee, Florida; "Proceedings of the Annual Meeting of the Lightwood Research Coordinating Council," January 22–23, 1975, Jacksonville, Florida, published March 1975, and available from William Hogan, Chevron Chemical Company, P.O. Box 160, Ocoee, Florida 32761; and Ranua, Pap. Puu 1975, 57(9) 597–9, Helsinki, Finland.

The most pertinent parts of these references have to do with applying dilute, sublethal aqueous solutions of normally herbicidal bipyridylium salts to living pine wood xylem. This in a relatively short time (eg. 3–6 months in the U.S. south) induces the formation of "lightwood" (also known as "litewood"), ie. wood with a heavy concentration of oleoresins even to the point of being translucent in thin section. Such phenomenon is referred to as "lightering".

Commercially available bipyridylium salts include the herbicides paraquat and diquat which are known also by the trademarks Gramaxone and Reglone, respectively. Such marks are the property of Imperial Chemical Industries, Limited. The foregoing art and other reference material of a collateral nature are cited in the patentability brief accompanying this application; all of it is expressly made a part of this application.

Advantages of the present improvement over the closest prior suggestions include the fact that the distribution of increased oleoresinous material induced in the tree is far more even when using this improvement than when using a bipyridylium salt solution. In the latter instance the first bolt (that is, the first 5 feet of trunk above the zone of treatment) is quite rich in oleoresin after a reasonable period of time (eg., three months or more), and this effect attenuates with altitude in the trunk. In contrast, the comparative evenness of such distribution from use of the present improvement provides wood for a paper pulp mill that will process well. The improved treatment also is believed to be less of a shock to or stress on the tree, yet overall in the tree there is an increase in yield of deposited oleoresinous material that is substantially equal to that observed in comparable trees subjected to the bipyridylium salt treatment.

Other advantages include the clearly lower cost of the preferred instant treating chemicals. Additional advantages will be evident from this specification. Thus, while the present active agents are not commercial herbicides, they, as amines, usually stink a bit; in concentrated form some of them can be somewhat irritating to human skin. However, they are not to be classified as poisons as are the herbicidal bipyridylium salts. In fact, many of the instant active substances are considered quite biodegradable; weak solutions of same can be considered nitrogenous fertilizer.

BROAD STATEMENT OF THE INVENTION

The instant improvement in process for chemically inducing the production of oleoresinous material in association with living wood cells comprises using for such inducement a dilute dispersion of primary amine.

Such treatment typically is done to the living wood xylem of a standing tree, although systemic treatments such as rootfeeding or even treatment of wood cells growing in a basal medium or nutrient broth are conceivable. One effective method is termed "streaking". In this method the outer layers of the trunk of the living tree at a convenient height are cut away to expose or even penetrate the cambium for up to about a third of the circumference of the tree; then a dispersion of the dilute chemical treating agent is brushed or sprayed on the wound until it begins to drain off. This amounts to a few milliliters.

The trunk of the tree also can be treated radially or otherwise around a diameter at a convenient altitude. The closer the injection is to the ground, generally the more oleoresinous material will be available in the tree in time because the oleoresinous-enrichment effect appears to travel decidedly upwardly, but downwardly only incidentally if at all. The injections can be done into punctures or bored holes, and can be as close as three inches apart on the periphery of the trunk at a given elevation, which usually will be fairly low. Another method is to bore a hole on a chord off-center of the trunk and slightly downwardly therein, and to feed treating dispersion into that hole.

Various proprietary hand tools with reservoirs are sold for injecting chemicals into trees. One of them is the Hypohatchet, which is the trademark of T.S.I. Company, Flanders, New Jersey; another is the Jim-Gem tool, the trademark of Forestry Suppliers Incorporated, Jackson, Mississippi. The latter tool is perhaps the best I have noted for the instant purpose as I have found it to provide for fairly consistent treatment without excessive effort. It readily makes a shallow cut low on the trunk with a small chisel edge. Into this cut a small, measured quantity of treating dispersion can be flushed, using a lever on the lower part of the tool. This treatment can be repeated at, say, three-inch or further intervals around the trunk at a low elevation.

Where wood cells grown in a suspension culture are to be treated, clearly care must be taken to use sublethal dosage of the treating agent and dosages of the primary amine not in excess of about 1 mg. per liter and preferably about 0.1 mg. per liter of culture are indicated. The article by Brown and Laurence, *For. Sci.* 14: 62–64, 1968, describes a nutrient medium for such culture of pine cells.

For efficiency and economy in the present treatment the advantageous primary amines are those which dissolve in or form stable aqueous solutions in water at about 20° C. in a concentration adequate for this treatment without the use of, or with the use of a very little, extraneous solubilizing agent. Thus, $C_{1-12}$ primary aliphatic monoamines are advantageous here, and the preferred ones for my purpose are $C_{2-5}$ alkylamines. The most preferred here are n-propylamine and iso-propylamine. Curiously, n-propylamine is substantially more efficaceous than methylamine for the instant use. $C_{7+}$ lower aliphatic primary amines on up to primary "fatty" amines, eg. $C_{18+}$, aliphatic monoamines and including cycloaliphatic primary amines such as resin acid amines from rosin will ionize readily with a protonic acid such as sulfuric, hydrochloric, acetic, or the like to be adequately water soluble or dispersible for this purpose. Alternatively, organic solvents such as lower alkanols, eg. methanol, ethanol, iso- or n-propanol, can be used as effective dispersing or dissolving agents for the higher molecular weight monoamines (a practical upper carbon atom limit for which is 22). Secondary and tertiary amines tested have not measured up to the primary ones for the instant purpose. Effective concentration of the primary amine in water for the instant treatment can be as low as about 1%, advantageously 2–10% by weight, and it can be even higher up to 15% or 20% or more where cost is of little concern and dispersion stability is readily obtained. Clearly water is the amine dispersion vehicle of choice. Other useful liquid or paste vehicles are those agriculturally acceptable and not decidedly crippling to the tree in the concentration and volume used. Useful liquids include ethanol, isopropanol, acetone and mixtures and aqueous solutions of same. These are fugitive like water, but more expensive, Likewise glycol vehicle is fairly expensive, but not highly volatile or susceptible towards freezing. Pasty gels, eg. hydrogels, containing the amine also can be used on tree wounds.

Other specific commercially available primary amines useful for the instant purpose include:

| | |
|---|---|
| ethylamine | monoethanolamine |
| butylamine | N-aminoethylethanolamine |
| ethylenediamine | monoisopropanolamine |
| triethylenetetramine | polyglycolamine (M.W. ∝ 163) |
| tetraethylenepentamine | aniline |
| propylene diamine | benzylamine |
| dimethylaminopropylamine | cyclohexylamine |
| diethylaminopropylamine | N-aminoethyl piperazine |
| N,N-bis-(3-aminopropyl) | allylamine |
| methylamine | tall oil fatty acid amines |

Pronounced herbicidal activity of the useful primary amine appears to be of no advantage in the practice of this invention, and clearly the lack of it is advantageous.

Volume of treatment per live tree for a 6- to 8-inch diameter (at chest-high) tree is adequate at about 1 to about 5 milliliters. The treatment ordinarily is done but once, then the tree left to grow until harvesting. (Obviously additional treatments can be done if desired.) As the wounding of the tree in the treating process tends to stress it, it can be advantageous to mix in with the treating solution or to apply just before or after treating an insecticide at least locally about the wound (and advantageously over the lower third of the trunk if such expense can be borne). Even more advantageous is the similar application of a non-phytotoxic insect repellent such as 2-(n-octylamino)-2-methyl-1-propanol or the like (the active agents of U.S. Pats. Nos. 3,826,842 and 3,933,915) to part or all of the tree to ward off insect infestation at least for a modest time after the treatment.

(Insect attack on a stressed tree does not necessarily occur at a wounded area, but can occur various places on the tree. Hence, insecticide or insect repelling treatment over the whole tree, eg. by fog gun or aerial spray, can be useful.)

The trees best adapted to chemical inducing of the deposition of oleoresinous material in the main are pines. A partial listing of tree species for this treatment follows:

| | | |
|---|---|---|
| Pinus palustris | Pinus strobus | Pinus virginia |
| Pinus elliottii | Pinus banksiana | Pinus montecola |
| Pinus taeda | Pinus rigida | Pinus patula |
| Pinus echinata | Pinus resinosa | Pinus insularis |
| Pinus serotina | Pinus radiata | Pinus merkusii |
| Pinus clausa | Pinus teocote | Pinus excelsa |
| Pinus glabra | Pinus chihuahuana | Pinus khasya |
| Pinus ponderosa | Pinus caribaea | Pinus gerardiana |
| Pinus lambertiana | Pinus pinaster | Picea glauca |
| Pinus contorta | Pinus nigra | Pseudotsuga menziesii |
| Pinus jeffreyi | Pinus silvestris | |

As fairly abundant oleoresinous material in a relatively short time can be distributed fairly well throughout the whole tree, it is evident that more than just a local action is occurring. At presently estimated treating costs and prices of naval stores from kraft pulping, it is projected that the average stand of slash pine in northern Florida treated in accordance with the instant improvement can be a financially break-even proposition in about three months. Beyond this point the increase in oleoresinous material (and thus-recoverable byproduct naval stores) can become financially quite profitable as the tree continues to grow. At the end of six months to a year in such climate the harvested tree can yield these valuable byproducts to conventional processing. In higher latitudes north and south the action is expected to be considerably slower in view of the lower average temperature and shorter growing season.

The following examples show ways in which the instant improvement has been practiced, but should not be construed as limiting the invention. In this specification all temperatures are in degrees Centigrade, all parts are parts by weight, and all percentages are weight percentages unless otherwise expressly indicated.

EXAMPLE 1

Thirteen-year-old Florida slash pines (Pinus elliottii) were injected just beneath their cambium layers with dilute aqueous n-propylamine solution by use of a gas-powered hypodermic needle injector at one-inch intervals for one-third of the circumference of the trees at an elevation 6 inches above the ground. The treating solution was 10% of said amine dissolved in water, and the injection apparatus was a Med-E-Jet (trademark of the Med-E-Jet Corporation, Cleveland, Ohio) injector modified for veterinary use. The trees at breast-high measured about 6 inches in diameter. Approximately ½ ml. of the amine solution was injected at each puncture for a total of 3 ml. injected into each tree.

Various like control trees in this grove were injected with an 8% aqueous solution of paraquat in like manner (said 8% concentration believed optimum for producing extractives in this species of pine). The average oleoresin content of 11 untreated trees cut from this grove and analyzed is shown under "None".

At three months and at six months the test trees were cut into bolts as follows: the first 5 feet above the stump was bolt 1; the next 5 feet was bolt 2; the next 10 feet was bolt 3; and the next 10 feet was bolt 4. Representative samples of each bolt were analyzed.

Analysis of bolts showed the following:

|  | Treatment Chemical | | | | |
|---|---|---|---|---|---|
| Turpentine, pounds per | | n-propylamine | | paraquat | |
| 100 pounds of dry wood | None | 3 months | 6 months | 3 months | 6 months |
| Bolt 1 | 0.332 | 0.41 | 0.51 | 0.67 | 1.02 |
| Bolt 2 | 0.318 | 0.46 | 0.63 | 0.26 | 0.31 |
| Bolt 3 | 0.318 | 0.33 | 0.51 | 0.33 | 0.22 |
| Bolt 4 | 0.320 | 0.58 | 0.48 | 0.26 | 0.28 |
| Whole tree (weighted average) | 0.312 | 0.44 | 0.56 | 0.41 | 0.60 |
| Resin acids, pounds per 100 pounds of dry wood | | | | | |
| Bolt 1 | 1.37 | 1.50 | 2.25 | 3.15 | 2.93 |
| Bolt 2 | 1.93 | 1.81 | 2.00 | 1.20 | 1.24 |
| Bolt 3 | 1.54 | 1.94 | 1.86 | 1.74 | 1.18 |
| Bolt 4 | 1.63 | 2.45 | 1.57 | 1.75 | 1.53 |
| Whole tree (weighted average) | 1.47 | 1.94 | 1.92 | 2.05 | 2.06 |

EXAMPLE 2

Simultaneously with the test described in Example 1 various slash pines in the same area (grove) were treated with an aqueous solution of 10% methylamine in the same manner as those treated with n-propylamine and paraquat. The results were as follows:

| Turpentine, pounds per | methylamine | |
|---|---|---|
| 100 pounds of dry wood | 3 months | 6 months |
| Bolt 1 | 0.38 | 0.49 |
| Bolt 2 | 0.41 | 0.36 |
| Bolt 3 | 0.37 | 0.36 |
| Bolt 4 | 0.46 | 0.30 |
| Whole tree (weighted average) | 0.40 | 0.37 |
| Resin acids, pounds per | methylamine | |
| 100 pounds of dry wood | 3 months | 6 months |
| Bolt 1 | 2.06 | 1.49 |
| Bolt 2 | 2.12 | 1.31 |
| Bolt 3 | 1.83 | 1.40 |
| Bolt 4 | 2.07 | 1.42 |
| Whole tree (weighted average) | 2.01 | 1.41 |

I claim:

1. In a process for chemically inducing the production of oleoresinous material in association with living wood cells, the improvement which comprises using for said inducing a dilute dispersion of $C_{1-7}$ primary aliphatic amine.

2. The process of claim 1 wherein the inducing is done in a living tree.

3. The process of claim 1 wherein said amine is used in dispersion concentration of about 1–15% by weight.

4. The process of claim 3 wherein said amine is a $C_{2-5}$ alkylamine.

5. The process of claim 4 wherein said amine comprises propylamine and the dispersion vehicle is water.

6. The cut bolt of a tree treated in accordance with the process of claim 2, said cut bolt having a substantially even distribution of oleoresinous material therein.

* * * * *